US009387912B2

(12) United States Patent
Lee

(10) Patent No.: US 9,387,912 B2
(45) Date of Patent: *Jul. 12, 2016

(54) PANEL INSERTS FOR AIRCRAFT AND OTHER VESSELS

(75) Inventor: Thomas M. Lee, Coto de Caza, CA (US)

(73) Assignee: Driessen Aircraft Interior Systems, Inc., Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/112,397

(22) Filed: May 20, 2011

(65) Prior Publication Data

US 2011/0215199 A1    Sep. 8, 2011

Related U.S. Application Data

(63) Continuation-in-part of application No. 12/901,054, filed on Oct. 8, 2010.

(60) Provisional application No. 61/278,745, filed on Oct. 9, 2009.

(51) Int. Cl.
| | |
|---|---|
| *B64D 11/00* | (2006.01) |
| *B63B 29/22* | (2006.01) |
| *B61D 37/00* | (2006.01) |
| *B64D 11/04* | (2006.01) |

(52) U.S. Cl.
CPC ............... *B63B 29/22* (2013.01); *B61D 37/00* (2013.01); *B64D 11/04* (2013.01); *Y10T 428/24008* (2015.01)

(58) Field of Classification Search
CPC ........ B61D 37/00; B63B 29/22; B64D 11/04; Y10T 428/24008
USPC .............. 244/118.5; 40/584, 603; 428/99
See application file for complete search history.

(56) References Cited

U.S. PATENT DOCUMENTS

| | | | | |
|---|---|---|---|---|
| 3,102,314 | A | * | 9/1963 | Alderfer .................... 24/303 |
| 3,673,720 | A | | 7/1972 | Thornton |
| 3,802,103 | A | * | 4/1974 | Neff ............................ 40/591 |

(Continued)

FOREIGN PATENT DOCUMENTS

| | | |
|---|---|---|
| CH | 692229 | 3/2002 |
| CN | 2583761 | 10/2003 |

(Continued)

OTHER PUBLICATIONS

International Search Report and Written Opinion dated Jun. 17, 2011 in related Application No. PCT/US2010/052002.

(Continued)

*Primary Examiner* — Brian M O'Hara
*Assistant Examiner* — Assres H Woldemaryam
(74) *Attorney, Agent, or Firm* — Kilpatrick Townsend & Stockton LLP; Dean W. Russell; Kristin M. Crall

(57) ABSTRACT

Embodiments of the present invention provide a system that provides a cohesive, harmonized look to aircraft galleys and other aircraft areas. The system allows airlines to easily change the decorative front fascia of galley (and other) airline components, even while the components are installed on the aircraft. The replacement is accomplished without the use of tools or extensive manual effort by providing replaceable and interchangeable panels for use on aircraft or other passenger transport vehicles or vessels.

14 Claims, 11 Drawing Sheets

(56) References Cited

U.S. PATENT DOCUMENTS

| | | | |
|---|---|---|---|
| 4,618,118 A | 10/1986 | Nardella et al. | |
| 4,650,103 A | 3/1987 | Mitchell | |
| 4,804,572 A | 2/1989 | Bodrogi | |
| 4,809,454 A | 3/1989 | Weisman | |
| 5,148,618 A | 9/1992 | Brewster | |
| 5,158,346 A | 10/1992 | Marks et al. | |
| 5,165,526 A | 11/1992 | Conklin, Jr. | |
| 5,244,080 A | 9/1993 | Bierbaum | |
| 5,280,831 A | 1/1994 | Conklin, Jr. | |
| 5,330,044 A | 7/1994 | Conklin, Jr. | |
| 5,415,451 A * | 5/1995 | Stanton | 296/21 |
| 5,427,227 A | 6/1995 | Crandall et al. | |
| 5,507,109 A * | 4/1996 | Rinzler | 40/603 |
| 5,649,730 A * | 7/1997 | Ramos | 296/21 |
| 5,657,566 A | 8/1997 | Key | |
| 5,664,354 A * | 9/1997 | Daviau et al. | 40/603 |
| 5,761,839 A | 6/1998 | Heikkila | |
| 5,806,942 A | 9/1998 | Jenkins, Jr. et al. | |
| 5,941,002 A * | 8/1999 | Rusin | 40/611.06 |
| 6,036,250 A * | 3/2000 | Glatter | 296/21 |
| 6,055,754 A | 5/2000 | Melhuus | |
| 6,073,375 A | 6/2000 | Fant et al. | |
| 6,086,174 A | 7/2000 | Graves et al. | |
| 6,116,167 A | 9/2000 | Rabe | |
| 6,126,112 A | 10/2000 | Apel et al. | |
| 6,305,111 B1 * | 10/2001 | Opdahl | 40/603 |
| 6,601,913 B2 | 8/2003 | Romca et al. | |
| 6,706,373 B2 | 3/2004 | Corn et al. | |
| 6,769,726 B1 * | 8/2004 | Clark | 296/21 |
| 6,809,921 B2 * | 10/2004 | Wu et al. | 361/679.56 |
| 6,826,861 B2 | 12/2004 | Alexander et al. | |
| 6,883,260 B1 * | 4/2005 | Cobb et al. | 40/611.08 |
| 6,971,147 B2 * | 12/2005 | Halstead | 24/303 |
| 7,104,599 B2 | 9/2006 | Berger et al. | |
| 7,109,885 B1 * | 9/2006 | Denlinger | 340/908 |
| 7,143,535 B1 * | 12/2006 | Cobb et al. | 40/611.08 |
| 7,325,343 B2 | 2/2008 | Seiber et al. | |
| 7,621,593 B2 | 11/2009 | Dickinson | |
| 7,843,295 B2 * | 11/2010 | Fullerton et al. | 335/306 |
| 7,987,622 B2 * | 8/2011 | Pitt et al. | 40/603 |
| 8,037,629 B2 * | 10/2011 | Harris | 40/594 |
| 8,037,631 B2 * | 10/2011 | Harris | 40/662 |
| 8,111,208 B2 | 2/2012 | Brown | |
| 2002/0066393 A1 | 6/2002 | Strode et al. | |
| 2002/0109604 A1 | 8/2002 | Martin | |
| 2002/0194760 A1 * | 12/2002 | Wittenberg | 40/603 |
| 2003/0000901 A1 | 1/2003 | Salatin et al. | |
| 2003/0160009 A1 * | 8/2003 | Wells et al. | 211/13.1 |
| 2004/0003525 A1 * | 1/2004 | Daryabagi et al. | 40/584 |
| 2005/0005544 A1 | 1/2005 | Borowiecki et al. | |
| 2005/0052516 A1 | 3/2005 | Wilde et al. | |
| 2005/0166431 A1 * | 8/2005 | Boron et al. | 40/607.03 |
| 2005/0166435 A1 | 8/2005 | Lackey et al. | |
| 2005/0188571 A1 | 9/2005 | Wilson | |
| 2005/0252053 A1 | 11/2005 | Pena | |
| 2006/0070282 A1 * | 4/2006 | Craig et al. | 40/590 |
| 2006/0118676 A1 | 6/2006 | Novak et al. | |
| 2006/0145002 A1 * | 7/2006 | Van Loon | A47B 51/00 244/118.1 |
| 2006/0181105 A1 | 8/2006 | Puschmann | |
| 2006/0219693 A1 | 10/2006 | Earls et al. | |
| 2006/0230657 A1 | 10/2006 | Kotze | |
| 2006/0254101 A1 | 11/2006 | Callison et al. | |
| 2006/0260162 A1 * | 11/2006 | Ballinger | 40/591 |
| 2006/0277807 A1 | 12/2006 | Wilde et al. | |
| 2007/0056231 A1 * | 3/2007 | DiMario et al. | 52/204.53 |
| 2007/0107277 A1 | 5/2007 | Simms et al. | |
| 2007/0182181 A1 * | 8/2007 | Cohen et al. | 296/21 |
| 2008/0000399 A1 | 1/2008 | Herbert et al. | |
| 2008/0148613 A1 * | 6/2008 | Lefebvre | 40/601 |
| 2008/0148615 A1 | 6/2008 | Mileski | |
| 2008/0186683 A1 * | 8/2008 | Ligtenberg et al. | 361/726 |
| 2008/0216368 A1 * | 9/2008 | Delamere | 40/590 |
| 2008/0284983 A1 | 11/2008 | Dula | |
| 2009/0007517 A1 | 1/2009 | Swanson | |
| 2009/0224103 A1 | 9/2009 | Neumann et al. | |
| 2009/0249664 A1 * | 10/2009 | Golle | 40/446 |
| 2009/0250574 A1 | 10/2009 | Fullerton et al. | |
| 2009/0322125 A1 | 12/2009 | Berger et al. | |
| 2010/0011641 A1 | 1/2010 | Hill | |
| 2011/0084164 A1 | 4/2011 | Lee | |
| 2012/0113364 A1 | 5/2012 | Hsueh | |
| 2012/0169192 A1 | 7/2012 | Simon | |

FOREIGN PATENT DOCUMENTS

| | | | |
|---|---|---|---|
| CN | 2850424 | 12/2006 | |
| CN | 200944295 | 9/2007 | |
| CN | 201069636 | 6/2008 | |
| DE | 102005043610 | 3/2007 | |
| EP | 0819404 | 1/1998 | |
| EP | 0922413 | 6/1999 | |
| EP | 0922413 * | 4/2003 | A47B 31/00 |
| EP | 1376518 A2 | 1/2004 | |
| EP | 1529482 | 5/2005 | |
| EP | 1591040 | 11/2005 | |
| EP | 2457831 A2 | 5/2012 | |
| FR | 2677791 | 12/1992 | |
| GB | 2298673 | 9/1996 | |
| GB | 2321757 | 8/1998 | |
| GB | 2391102 | 1/2004 | |
| GB | 2421473 | 6/2006 | |
| GB | 2437612 | 10/2007 | |
| IE | 20080182 | 9/2008 | |
| JP | 2001204553 | 7/2001 | |
| JP | 2002196712 | 7/2002 | |
| NL | 1002515 * | 9/1997 | B62B 3/02 |
| NP | 1002515 | 9/1997 | |
| WO | WO-9113426 | 9/1991 | |
| WO | WO-9904381 | 1/1999 | |
| WO | WO-9956268 | 11/1999 | |
| WO | WO-0159744 | 8/2001 | |
| WO | WO-02073574 | 9/2002 | |
| WO | WO-03009586 | 1/2003 | |
| WO | WO-2005015527 | 2/2005 | |
| WO | WO-2006104575 | 10/2006 | |
| WO | WO-2007121766 | 11/2007 | |
| WO | WO-2008111033 | 9/2008 | |
| WO | 2011044476 | 4/2011 | |
| WO | 2012161925 A2 | 11/2012 | |

OTHER PUBLICATIONS

Office Action dated Sep. 27, 2012 in U.S. Appl. No. 12/901,054.
International Preliminary Report on Patentability dated Apr. 11, 2012 in Application No. PCT/US2010/052002.
Response dated Jan. 28, 2013 in U.S. Appl. No. 12/901,054.
Office Action dated May 10, 2013 in U.S. Appl. No. 12/901,054.
International Search Report and Written Opinion of the International Searching Authority dated Feb. 13, 2014 in Application No. PCT/US2012/035920.
International Preliminary Report on Patentability dated Mar. 6, 2014 in Application No. PCT/US2012/035920.
Office Action dated May 9, 2014 in U.S. Appl. No. 12/901,054.
U.S. Appl. No. 12/901,054, Non-Final Office Action dated Mar. 25, 2015.
U.S. Appl. No. 12/901,054, Final Office Action dated Dec. 16, 2014.

* cited by examiner

PANEL INSERTS FOR AIRCRAFT AND OTHER VESSELS

This application is a continuation-in-part of U.S. Ser. No. 12/901,054 titled "Panel Inserts for Aircraft and Other Vessels" filed on Oct. 8, 2010, which claims the benefit of U.S. Provisional Application Ser. No. 61/278,745, filed Oct. 9, 2009 titled "Easily-Changed Panels for Galley Inserts in Aircraft or Other Vessels," the entire contents of which are hereby incorporated by reference.

FIELD OF THE INVENTION

Embodiments of the present invention relate generally to panel inserts for aircraft that can be easily changed, as well as components on the aircraft that are specifically designed to receive and cooperate with such panel inserts. Particular embodiments are designed for use in aircraft galleys and other locations on an aircraft or other passenger transport vehicle or vessel.

BACKGROUND

A number of food service and other components/hardware items are located in an aircraft galley. For example, an aircraft galley typically includes at least a water boiler, a beverage/food chiller, an oven, and a trash compactor. It may also include a coffee maker, storage cabinets or closets, trolleys/food service carts, and a number of other service and storage items/areas.

Traditionally, galley equipment has a single paint color or decorative laminate affixed to the front surface that faces that galley work area. The surface is intended to be generally neutral or to match the color of other decorative materials in the area. Once such equipment is installed, changing the colors or laminate materials is expensive and usually requires re-certifying the entire component with appropriate authorities or airframe manufacturers.

As airlines are moving more toward an integrated design approach in their galleys (as well as other areas on the aircraft), it is desirable that the galley components present a unified and harmonized look and feel. For example, if the door panels of all of the components have a similar color or finish, similar design, a unified graphic design, or an otherwise clean and uncluttered look, then the galley is much more visually appealing to travelers and airline attendants than if the door panels are a hodge-podge of colors and designs. Additionally, components that are located in an aircraft galley may initially all be purchased from one supplier so that they have a cohesive look and feel, although it is more often the case that varying components are purchased from a number of separate suppliers. This may result in the galley having a disjointed look and feel, which prevents the airline from projecting a unified and cohesive look in the galley area.

Moreover, even if the component door panels initially present a unified look (e.g., a similar color scheme or decor) when installed, over time, they may become scratched, dented, gummed with stickers or sticky notes (used to identify the food items located inside the component), marred, or otherwise damaged. This results in a galley that appears messy and unkempt. Travelers often pass by and through the galley areas. Thus, presenting a unified, uncluttered, and elegant look to the galley helps the airline project a professional and calming atmosphere. Damage to component door panels can interfere with this goal.

The present inventors have also identified a separate need, wherein airlines may wish to replace component doors that are not necessarily damaged, but to provide artwork, a billboard effect, decorative items, graphics, promotional, "white board" (easily erasable, marking board), or other functional or ornamental indicia across the galley area. These options are described in more detail below.

In the past, replacement of component panel doors has entailed removing the entire component (the oven, the chiller, or so forth) and installing a completely new component or unit. This can be expensive, wasteful, and time-consuming. Alternatively, just the door of the particular component may be removed and replaced, which is also expensive and time-consuming. A further option has been to non-removeably adhere (glue, bolt, or otherwise permanently secure) a separate, new panel to the component door. All of these options are expensive and time-consuming, requiring tools, downtime of the aircraft, and skilled maintenance personnel in order to effect the replacement or change. In short, these options are not optimal ways to achieve the desired results.

Another challenge that arises when components on an aircraft are replaced is that each and every time a part is changed or installed on the aircraft, it must receive a new part number and be independently Federal Aviation Administration (FAA) certified. This is in part to ensure that the parts meet non-flammability, smoke, and other FAA requirements. This additional certification can be expensive and time-consuming. There is thus a need for an improved system for replacing component door panels on aircraft and other passenger transport vehicles or vessels.

BRIEF SUMMARY

Airlines may wish to refresh the look of their galleys or other cabin areas from time to time. With the current approach to decorative finishes and laminates on galley components, the entire unit (or at least the door of the unit) would need to be upgraded or replaced. This typically requires wholly new certification of the entire galley component equipment. Accordingly, the present inventors have developed a system that provides a cohesive, harmonized look to aircraft galleys and other aircraft areas. The system allows airlines to easily change the decorative front fascia of galley (and other) airline components, even while the components are installed on the aircraft. The replacement is accomplished without the use of tools or extensive manual effort by providing replaceable and interchangeable panels for use on aircraft. The panel system also helps enhance the aesthetic value of the aircraft cabin and galley environment. Just the decorative or aesthetic quality finish may be replaced from unit to unit (or from door to door or from panel to panel), and the airline may select from a family of panel insert designs.

For example, embodiments described allow the airline to quickly and easily change panel inserts so that they match collectively across an entire galley or other area. Alternative embodiments allow the airline to display significantly larger advertising, logos, or other large surface area designs across an entire galley in order to achieve a billboard effect, rather than be restricted to designs on a single component. If a galley component is broken and needs to be removed from the aircraft, the panel insert may be quickly and easily transferred from the broken component to the replacement component, without having an unmatching component in the interim. Alternatively, the airline may simply wish to refurbish all component doors with a different color or design, and do so without extreme expense, down-time or regulatory considerations. At least one embodiment of the system described herein thus provides the option of a single certification step, wherein the system or family of panel inserts is initially certified, such that once installed, the entire component does not need to be re-qualified or certified.

DETAILED DESCRIPTION

Embodiments of the present invention provide a system of airline component door panel inserts that provide a cohesive, harmonized look to aircraft galleys and other aircraft areas. It may often be the case that damaged component doors need to be replaced, but airlines may also wish to use various embodiments described herein in order to provide a fresh new look to a galley area or other area on-board the aircraft. There is provided a system of easily-changeable panel inserts that may be removed, replaced, and interchanged relatively easily without specific tools or skilled maintenance personnel on the aircraft. The panel system helps enhance the aesthetic value of the aircraft cabin and galley environment. The system also provides the option of a single certification step, wherein the system of panel inserts is initially certified, and then, once installed, the component does not need to be re-certified.

Figure 1:
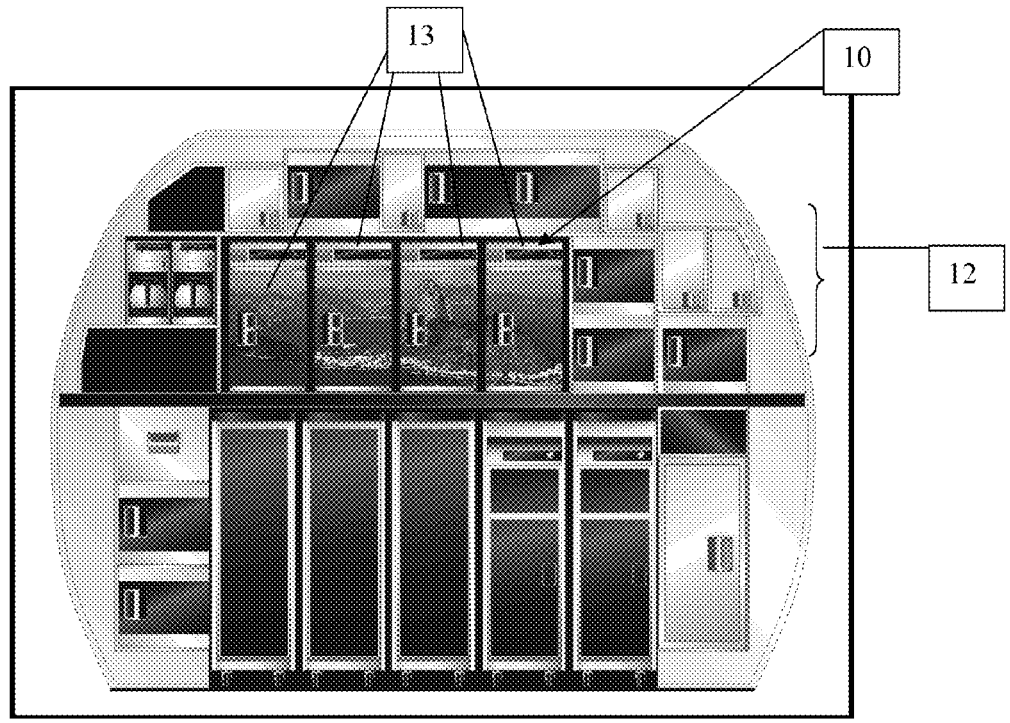
FIG. 1 shows a front plan view of an aircraft galley featuring one family of billboard panel inserts.
Figure 2:
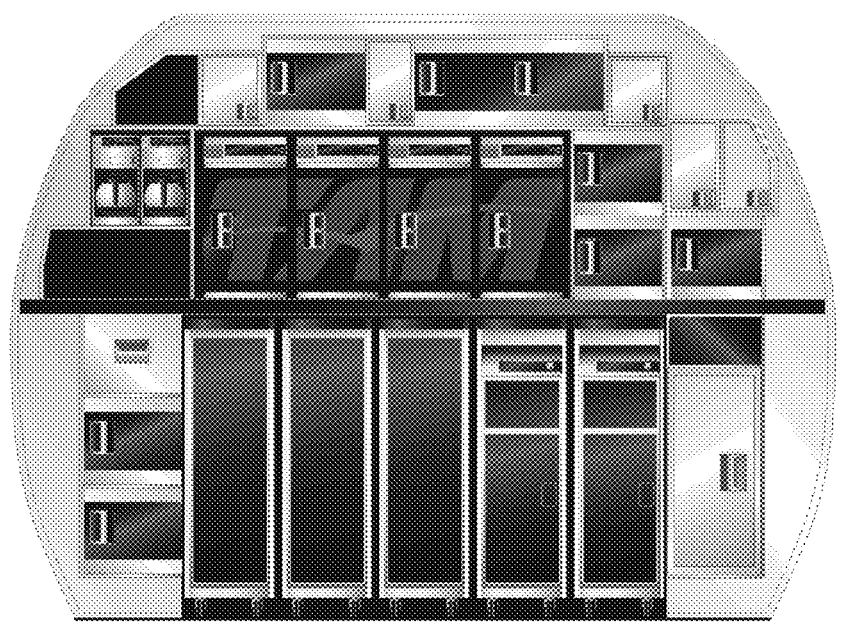
FIG. 2 shows a front plan view of an aircraft galley featuring an alternate family of billboard panel inserts.
Figure 3:
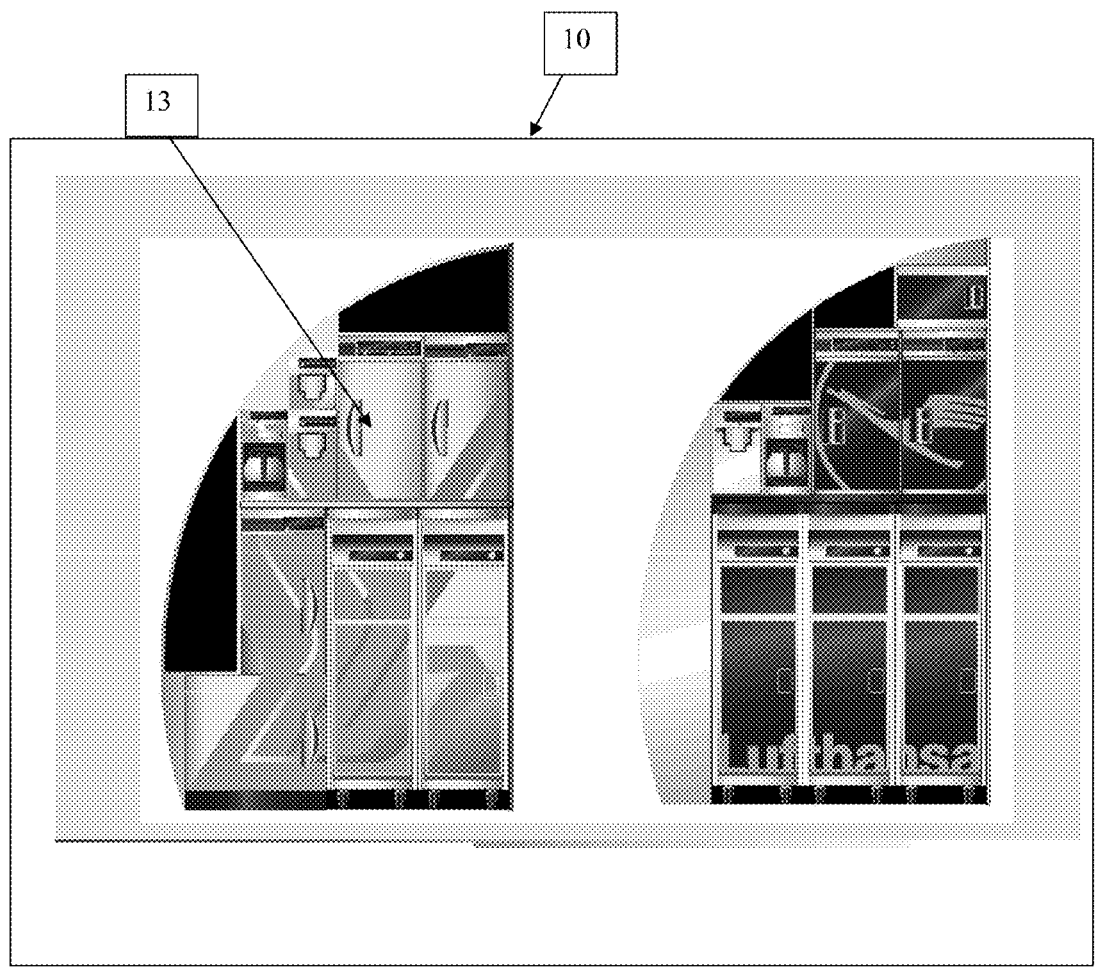
FIG. 3 shows a front plan view of an aircraft galley featuring a cohesive family of billboard panel inserts positioned on upper and lower components, and illustrates an example of how they may be interchanged.

As shown in FIGS. 1-3, various embodiments of the panel inserts 10 described herein may feature imprinted graphics, promotional indicia, decorative items, airline logos, advertisement material, artwork, visual indicia (including, for example, exit directional information), or any other design elements. In one embodiment, a family 12 of multiple panels 10 may each have a different design element or visual indicia or printed material (such as part of a photo, a letter, a logo, or any other feature) that collectively forms a billboard effect or a mural when positioned and viewed together. These panel inserts may be referred to as billboard panels 13, and this term is intended to refer to and include one or more panel insert(s) having any type of pattern, picture, text, printing, logo, photo, design, symbol, or any other visual indicia adhered to, printed on, or otherwise displayed by the panel insert.

For example, the family 12 of panels together may create a visually appealing scene, such as a photograph or picture of one of the destinations to which the airline travels, as shown in FIG. 1. Each panel may have a portion of the scene thereon, such that when installed or properly positioned, the panels collectively form a continuous visual effect, much like a mural. In another example shown in FIGS. 2 and 3, each panel has a portion of an airline name, airline logo, or other promotional item or service, such that when installed or properly positioned, the panels collectively form a desired, continuous visual effect.

Figure 4:
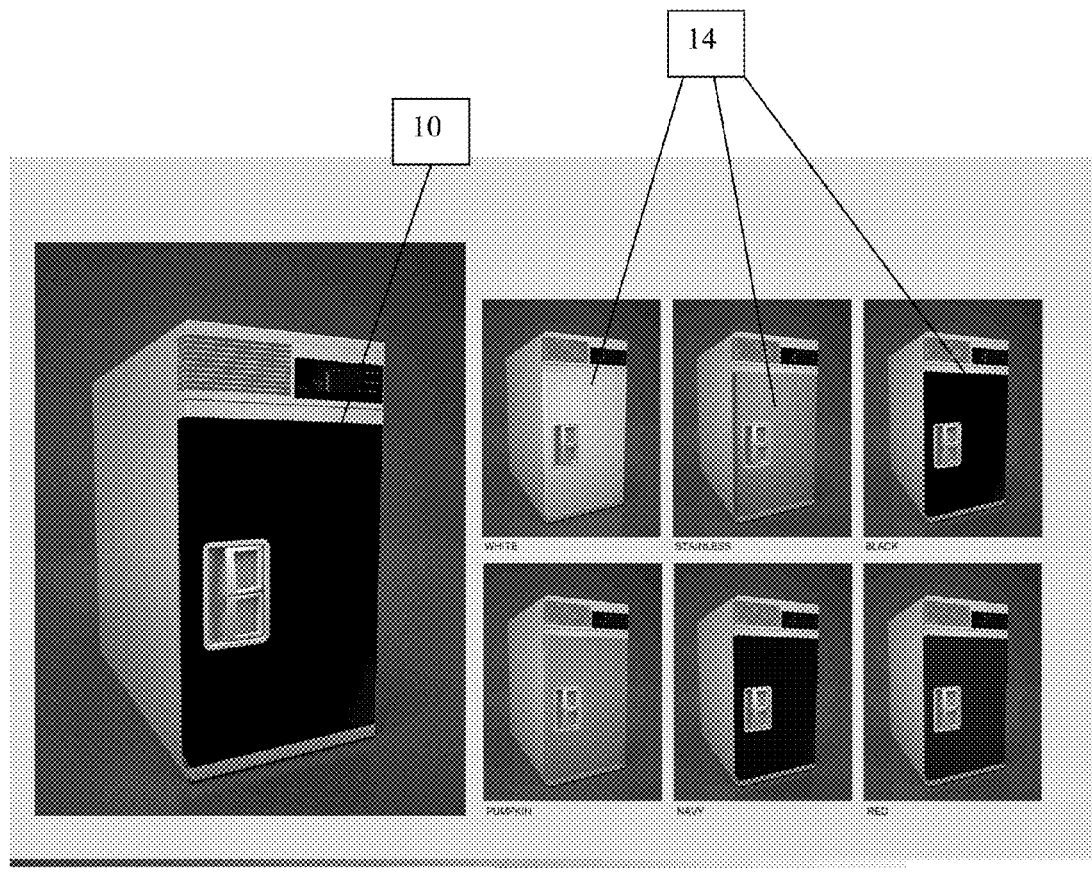
FIG. 4 shows a plurality of side perspective views of aircraft galley equipment components featuring single, replaceable, alternate colored panel inserts.

Other embodiments provide panel inserts that do not present a collective design, but that match a related color scheme or provide a generally muted design or pattern (rather than a series of graphics on two or more panels intended to be viewed as a billboard). These embodiments may be referred to as single panels 14. As such, single panels 14 do not need to be installed as part of a family of panels in order to be visually appealing, but can instead be installed individually and in no particular order. Examples of such features are shown in FIG. 4. Non-limiting examples include a stainless steel finish, a glossy or matte color finish, a fabric-type material, a wood-like or wood finish, laminate, vinyl, leather (real or faux), metals (e.g., aluminum or steel), ceramics, plastics (e.g., polycarbonate), glass, bendable glass, mirror-type or reflective finish, whiteboard material, chalkboard finish, a hologram, a lenticular image, or any other appropriate material that would enhance the decor of an aircraft interior or provide a functional advantage or look over the currently-installed door panels. The panels may feature a single solid color, one or more colors, or an individual repeating pattern (e.g., stripes, dots, chevrons, triangles, or any other design). One example could be a leather-like or wood-like finish that may have a grain or a textured appearance, but does not necessarily feature graphics or textual indicia. Another example could be a repeating shape design. In short, the installation of such single panels 14 does not require any order or sequence in order to present a unified look.

Any and all of the above visual options for either a billboard panel 13 or a single panel 14 will collectively be referred to as an "aesthetic quality." In order to lower inventory and provide enhanced options, it is possible that each of the front and back surfaces of the panel insert may feature an aesthetic quality. In one example, a front surface of the panel features a solid color and the back surface features a portion of scenery or a logo. Airline personnel may desire to interchange one option for another quickly and easily. For example, if a particular panel has printing (or an aesthetic quality) on both sides of the panel, an airline could reverse the panels at a destination city and have different scenes for different flights.

Panel inserts 10 may be attached or otherwise secured to any appropriate cabin surface. Although installation and use is described throughout with a particular emphasis for use in an aircraft galley and on galley component doors, it should be understood that the panel inserts may be installed on any appropriate cabin surface. For example, the panel inserts may be secured to component door(s) anywhere on the aircraft (such as oven door, chiller door, trash compactor door, boiler door, coffee maker panels, or so forth), storage cabinet door(s), lavatory door(s), overhead compartment door(s), galley cart/trolley or other food service cart, coat closet door(s), cockpit door(s), divider panel(s), tray table(s), seat back(s), exit row panels(s), or any other appropriate aircraft surface. In short, instead of only replacing damaged panels, an airline may also desire to periodically change the doors of its galley components, its lavatory doors, its closet doors, or any other space in the cabin interior in order to provide a different look and feel of the galley or other airline areas. Any and all of these options will be collectively referred to as a "receiving surface." For example, the airline may wish to provide artwork, a billboard scenery effect, the airline name, logo, or other promotional indicia in the galley or anywhere on the aircraft. The airline may instead wish to a club-like feel and provide a leather or wood panel look, or it may wish to provide a contemporary modern feel and use a stainless finish in the galley or other airline areas.

Generally, the panel inserts are configured and designed to be removeably and releaseably secured or fixed to a receiving surface 16. Removal and replacement of the panel insert does not require any special tools.

In one specific embodiment, the receiving surface 16 has a first securing mechanism 18 that is intended to cooperate with a second, corresponding securing mechanism 20 on the panel insert 10. The panel inserts 10 may be secured to the receiving surface 16 by cooperation between the first and second securing mechanisms, collectively referred to as a "securing system" 22. The panel inserts 10 are not adhesively bonded or otherwise permanently secured to the receiving surface 16, but instead, securing system 22 provides an easily-releasable and easily-changeable system for the panel inserts 10.

Figure 5:
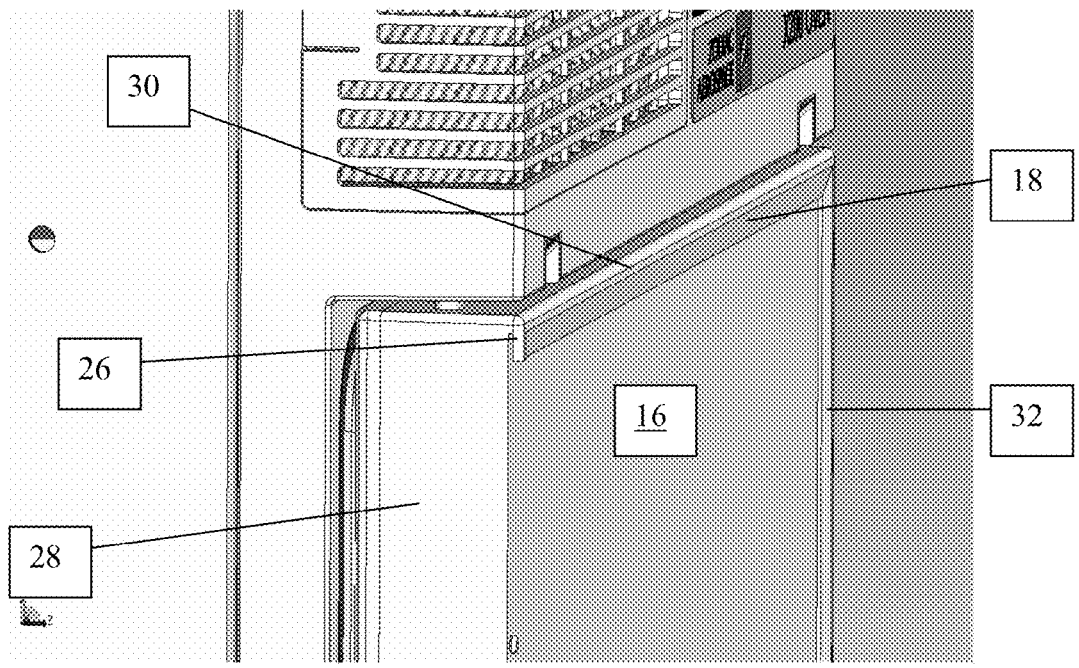
FIG. 5 shows a side perspective view of an aircraft galley equipment component door without having a panel insert positioned thereon.

In one embodiment, the securing system is a channel (or groove or slot) and edge cooperation. The panel insert 10 has one or more edges 24 that may slide into a slot, channel, pocket, or groove 26 on receiving surface. For example, as shown in FIG. 5, a galley component door 28 is shown as having a channel 26 along its top portion 30 and along one side edge 32. Channel may also be positioned along the bottom portion. Channel 26 may be formed as an overhang portion at the top of the receiving surface 16 (here, shown as a door 28), integral with the receiving surface, or it may be formed as a separate channel that is installed separately on receiving surface. Although not shown, channel 26 may alternatively be positioned along both sides and along the bottom of the receiving surface. Channel 26 may be continuously formed or it may simply be provided as a portion (e.g., a portion of a channel or of the door) positioned along receiving surface.

In use, edge 24 of panel insert 10 is slid into the channel 26. If channel 26 is positioned along the top, bottom, and one side edge of surface 16 as shown, then the panel insert edge 24 may be inserted from the opposite side edge (the side edge without the channel). If channel is positioned along both side edges and along the bottom of surface, then the panel insert edge 24 may be inserted from the top. Other insertion options, directions, and channel positions are also possible and considered within the scope of this invention.

Figure 6:
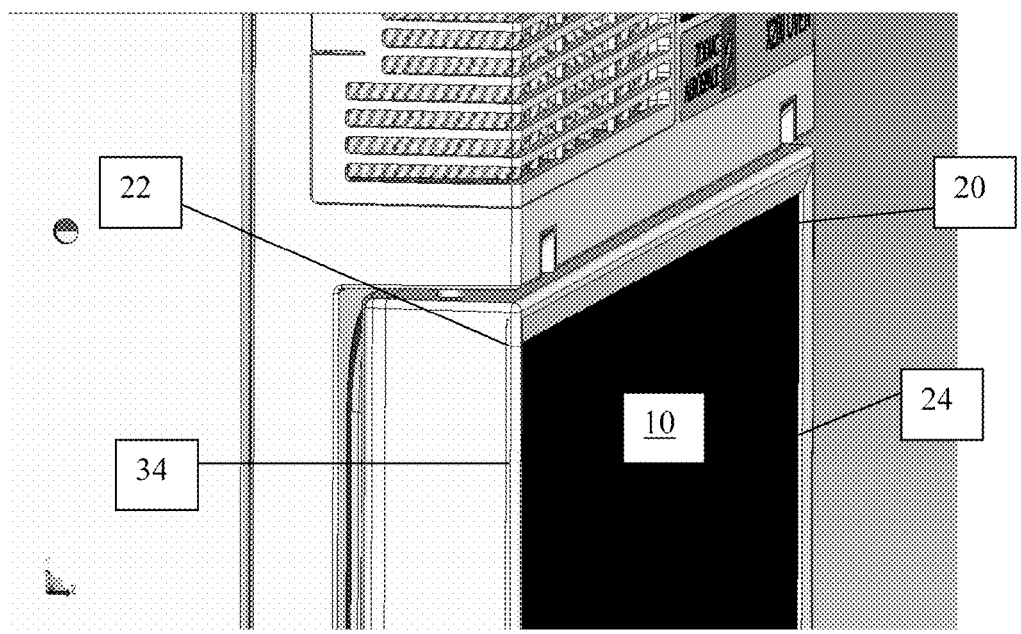
FIG. 6 shows a side perspective view of the aircraft galley equipment component door of FIG. 5 having a panel insert positioned thereon.
Figure 7:
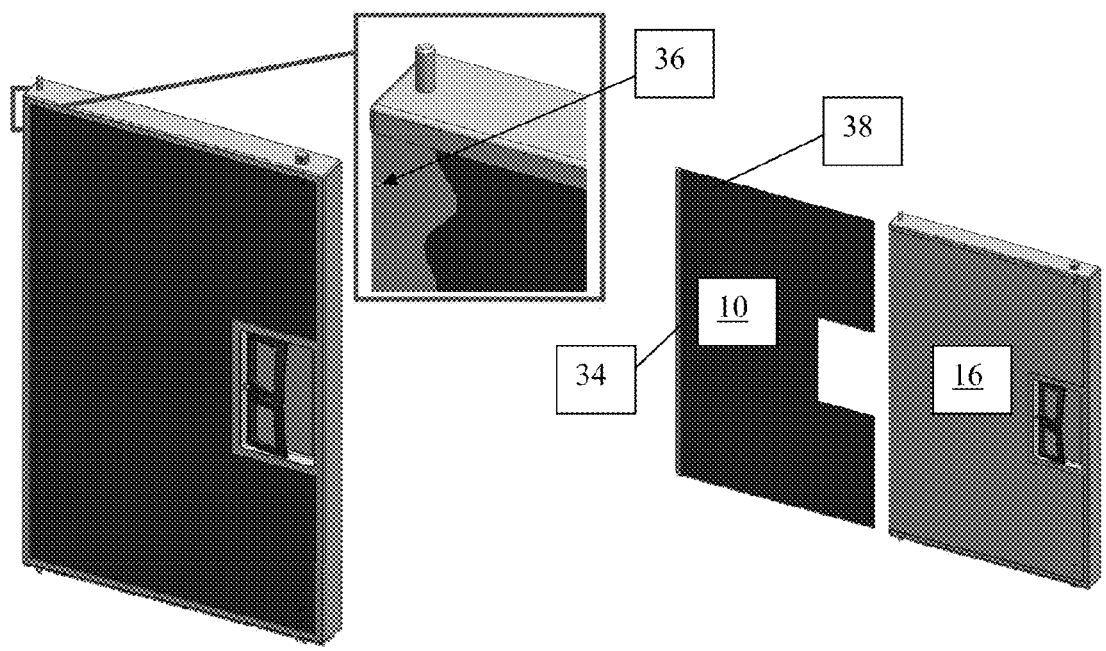
FIG. 7 shows one embodiment of a securing system for securing an insert panel.

One optional feature (particularly if the channel is provided as a separate channel portion) is a similarly-shaped trim edge 34. Trim edge may be provided as a strip that is similar in geometry or the same geometry as the other three edges, so that when it is installed, trim edge provides a "picture frame" look. Examples of trim edges 34 are shown in FIGS. 6 and 7. In one embodiment, trim edge is an approximately 0.06×0.3× 18" plastic strip attached to panel insert 10. Once installed, it may provide a continuous "picture frame" look around all four sides of the panel. It should be understood, however, that trim edge may be made of any appropriate material. One visually appealing effect is provided if the trim piece is of a similar material as the panel insert.

Upon insertion of the panel insert 10, the trim edge 34 may be removeably secured along the open edge where the panel was inserted in order to complete the look, as well as prevent inadvertent sliding of the panel insert. Trim edge 34 may snap onto the panel, be secured around the non-received panel edge (i.e., the edge that does not cooperate with the channel 26), it may be received in channel, or may be secured in any other appropriate manner.

The dimensions of channel may be any appropriate size, as long as it is slightly larger than the edge of panel, such that panel may slide into and be received in channel. In a specific embodiment, the width of the channel is about 0.030 inches and the thickness of the decorative panel is about 0.020 inches. These are provided as examples only and are not intended to limit this disclosure in any way. In another specific embodiment, the size of the panel insert is about 24 inches to about 24 inches, more particularly about 20 inches to about 20 inches, even more particularly about 17 to about 11 inches, and even more particularly about 17.6 inches to about 11.1 inches. It should be understood that the panel insert may be any appropriate dimension, however. For example, if used to cover a lavatory or cockpit door, it should accordingly be appropriately sized. Other dimensions and sizes can be understood and determined based on the intended use for panel insert.

In an alternate embodiment, the securing system is a dimple and recess cooperation. One of the panel insert 10 or the receiving surface 16 has a dimple 36 and the other of the panel insert or the receiving surface has a recess 38. In use, the dimple 36 mates with the recess 38. For example, as shown in FIG. 7, if the dimple 36 is located on the receiving surface 16, it mates with a recess on the back of panel insert. If the dimple is located on the back of panel insert, it mates with a recess on receiving surface. This allows panel insert to easily snap onto and off of receiving surface without the use of specific tools.

Any other connection or securing systems may be used in conjunction with the embodiments described herein. Any system that will removeably or interchangeably secure the panel inserts to a aircraft receiving surface is considered within the scope of this invention. For example, the securing system may be a ball and detent system, a dove-tail connection, a J-lock system, a magnetic system, a snap system, a hinged system (wherein a panel insert can have one or more pegs that are inserted into holes resembling hinge elements on the receiving surface and swung closed) a clip system, hook and loop (e.g., Velcro™), or any other appropriate system.

Figure 8:
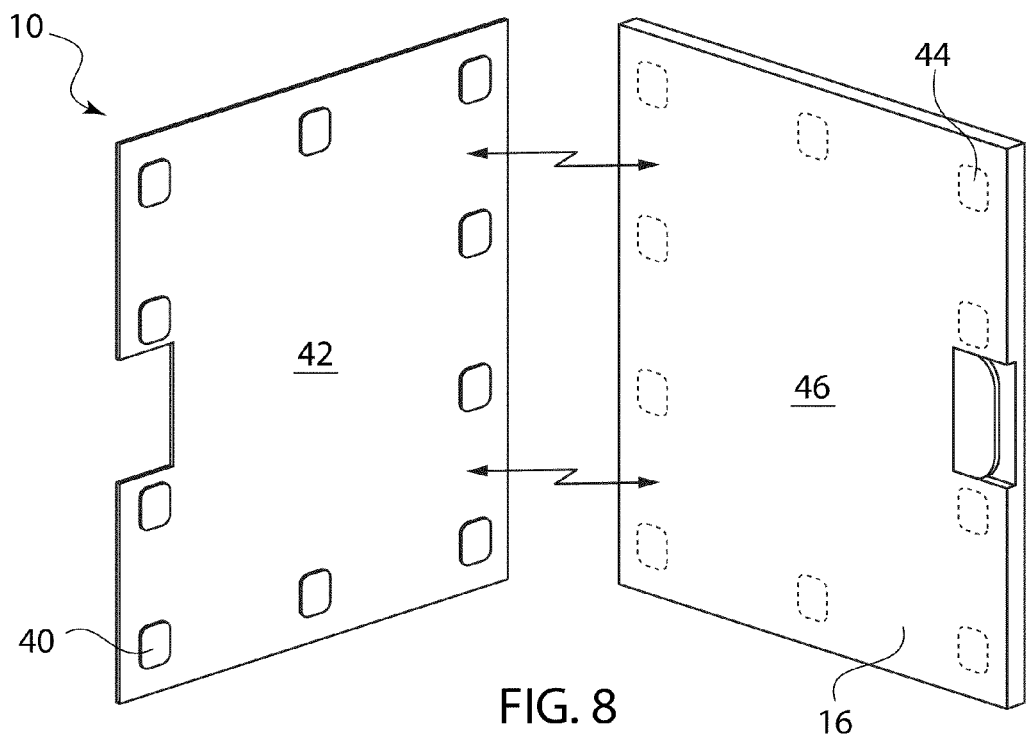
FIG. 8 shows one embodiment of an alternate system for securing a panel to a receiving surface using a magnetic system.
Figure 9:
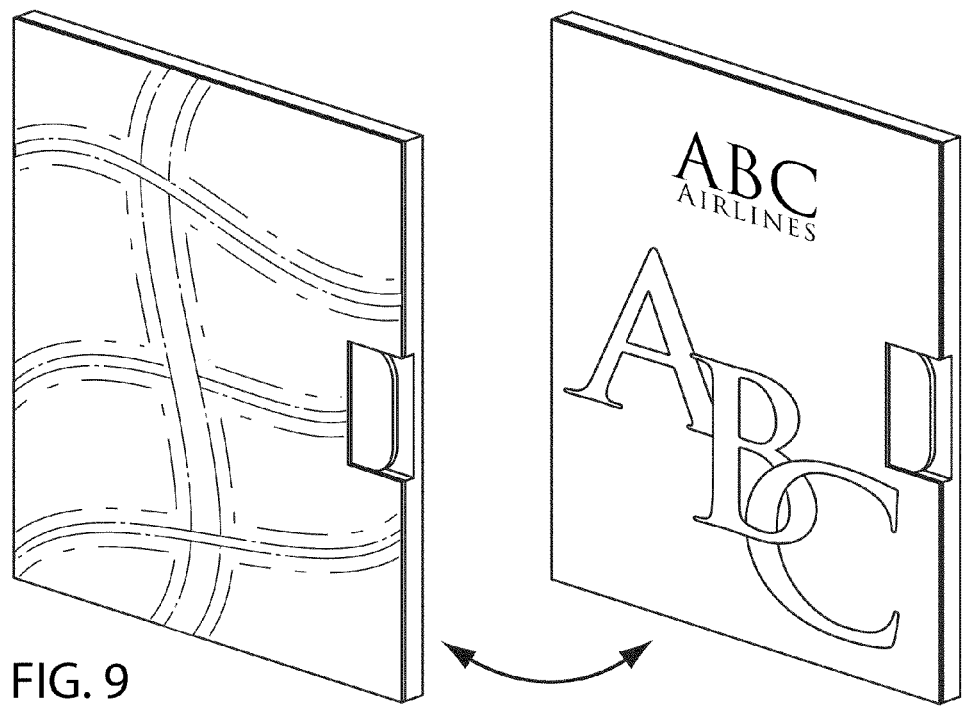
FIG. 9 shows a front view of the interchangeable system of FIG. 8.

For example, in a further embodiment, the securing system may be a magnetic system. The magnetic system may comprise a series of one or more small magnets 40 on the backside 42 of the panel 10 and one or more small corresponding magnetic surfaces 44 on the front side 46 of the receiving surface 16, or vice versa, or a combination thereof. In other words, the one or more magnets 40 may be on the panel or on the receiving surface and the corresponding magnetic surface 44 may be on the receiving surface or on the panel, or there may be a combination of magnets and corresponding magnetic surfaces between the replacement panel and the door. FIG. 8 shows an example with magnets 40 on the back of panel and magnetic surfaces 44 on the front of the door. The magnets and magnetic surfaces may be relatively small (in physical size or in number) in order to prevent interference with certain aircraft systems. For example, the magnetic securing system may be a series of strategically placed strong magnets and magnetic surfaces that can be positioned at the corners of the replacement panel and the door, along the edges of the replacement panel and the door, along any various portions of the replacement panel and the door, or anywhere else that is appropriate in order to secure the panel in place. The door may be designed and pre-provided with appropriate magnets and/or magnetic surfaces, or a current aircraft component door may be retrofitted with magnets and/or magnetic surfaces. The panel may then be removably positioned against the door for an interchangeable look, as shown in FIG. 9.

Alternatively, the magnets and magnetic surfaces may generally be the size of the whole door or to take up a substantial part of the door. The panel may have its entire back surface or a substantial part of its back surface covered with either a magnet or a magnetic surface and the door may have its entire front surface or a substantial part of its front surface covered with either a corresponding magnet or a magnetic surface. For example, the panel may be formed much like a magnetic bumper sticker that can be secured to a side of a car. A further embodiment comprises a magnetic surface panel (e.g., a panel that slides into a channel as described above) to which another panel having one or more magnets may be secured, be removed, and then be easily replaced. Alternatively, the door itself may be made of a magnetic surface material. This allows the airline to replace panels using a channel and/or a magnetic system. Having an entire panel or door that is made of a magnetic surface such a steel may add weight to the system, but it may add ease of use such that it is nonetheless acceptable. If this option adds an unacceptable amount of weight, the first-described option of having a series of smaller magnets and magnetic surfaces may be desirable.

Figure 10:
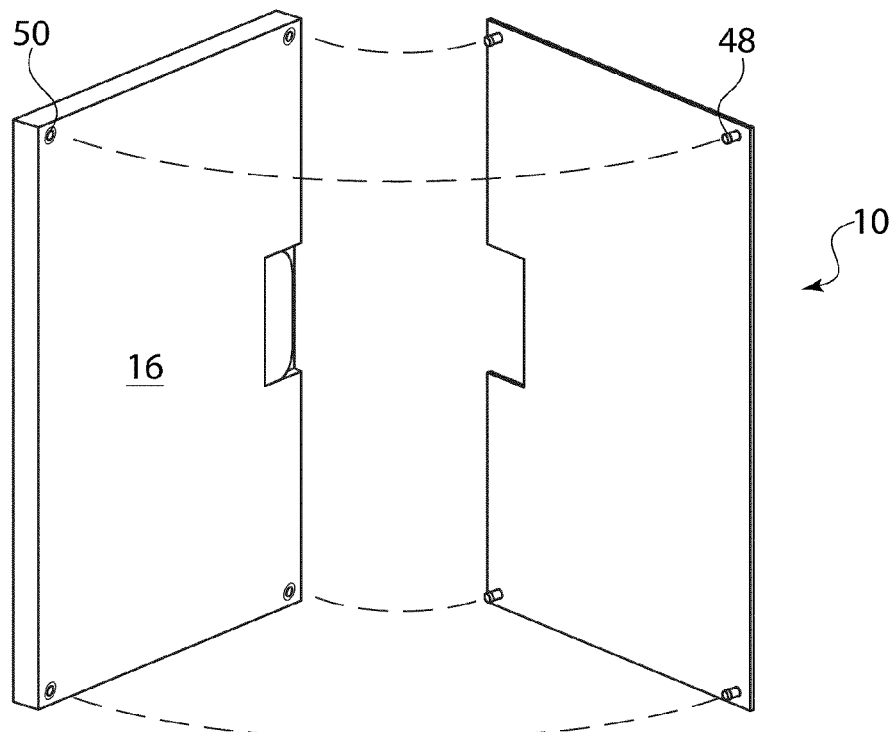
FIG. 10 shows another embodiment for securing a panel

A further embodiment may use a series of locator pins and/or a slight edge along an outer portion of the door in order to help stabilize and secure the panel in place. The locator pins may be magnetic, an indent and protrusion, ball and detent, push/press, or any other system that will allow accurate positioning of the panel on the door and prevent sliding or offsetting of the panel. The one or more pins may be on the door and the one or more receiving indentations may be on the panel, or vice versa. FIG. 10 shows an embodiment with locator pins 48 extending from the back of the panel and indentations 50 on the front of the door.

Figure 11:
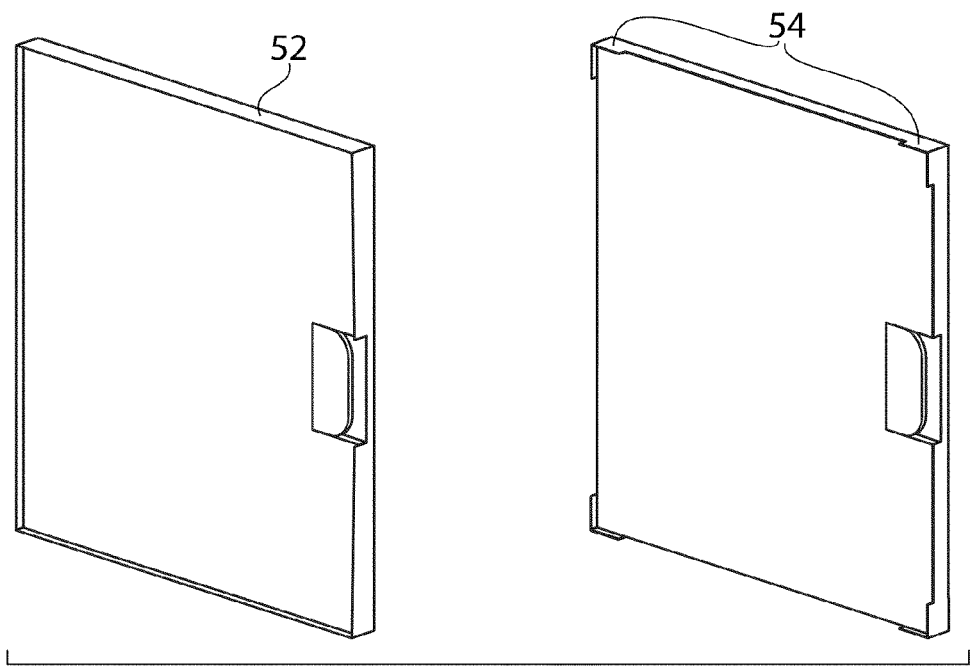
FIG. 11 shows a further embodiment for securing a panel to a receiving surface.

As shown in FIG. 11, providing a slight edge 52 along the outer portion of the door may also help prevent sliding. The edge may be a complete edge or it may just be portions of an edge 54 positioned along portions of the door. The raised height of the edge off the door is generally up to or less than the height of the panel so that the end result is a sleek door front. In other words, the edge is a very thin, barely noticeable edge that is used to help position the panel within the confines of the door and prevents the panel from sliding off. For example, in the magnetic embodiment, even if the magnet interaction is strong, an elbow brush could feasibly cause the panel to slide. Thus, one or more locators pins and/or the slight edge can keep the panel in place and continue the presentation of a clean, aesthetically pleasing surface.

In a further embodiment, the receiving surface may be a traditional surface (e.g., of the galley component door or other surface) that has been modified to receive a panel. In this embodiment, it is possible to retrofit an existing door or receiving surface to receive a panel. One option is to secure a series of one or more magnetic surfaces (with the panel being fit with one or more corresponding magnets) to the door or surface, or to secure one or more magnets (with the panel being fit with one or more corresponding magnetic surfaces) to the door or surface. This would allow an existing aircraft component door or surface to receive the billboard or single panels having an aesthetic quality that are detailed above.

A further method for retrofitting an existing vehicle surface to receive one or more panels is with a magnetic paint or primer. The existing door or surface could have one or more coats of a magnetic paint, primer, or other easily applied magnetic surface applied thereto. Magnetic paints and primers are intended to make an otherwise non-magnetic surface acceptable for receiving a magnet. They provide a base coat that allows a user to create a surface that attracts magnets almost anywhere, and can be applied to wood, metal, masonry, drywall, plaster, or any other appropriate surface. The panels could then have one or more magnets or magnetic features associated therewith such that they are easily applied and removed and replaced with respect to the door or surface.

Figure 12:
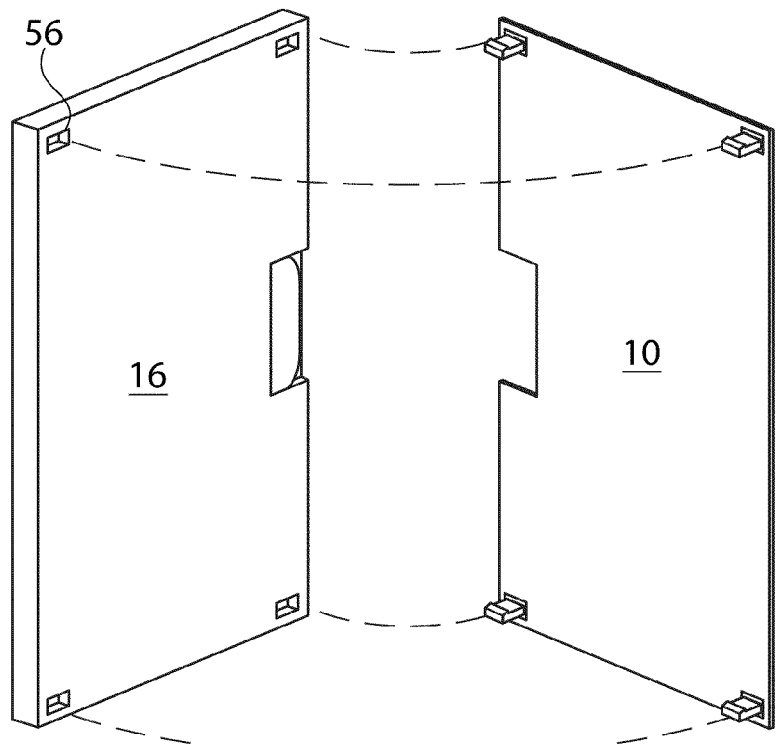
FIGS. 12 and 13 show further embodiments for securing a panel to a receiving surface.
Figure 13:
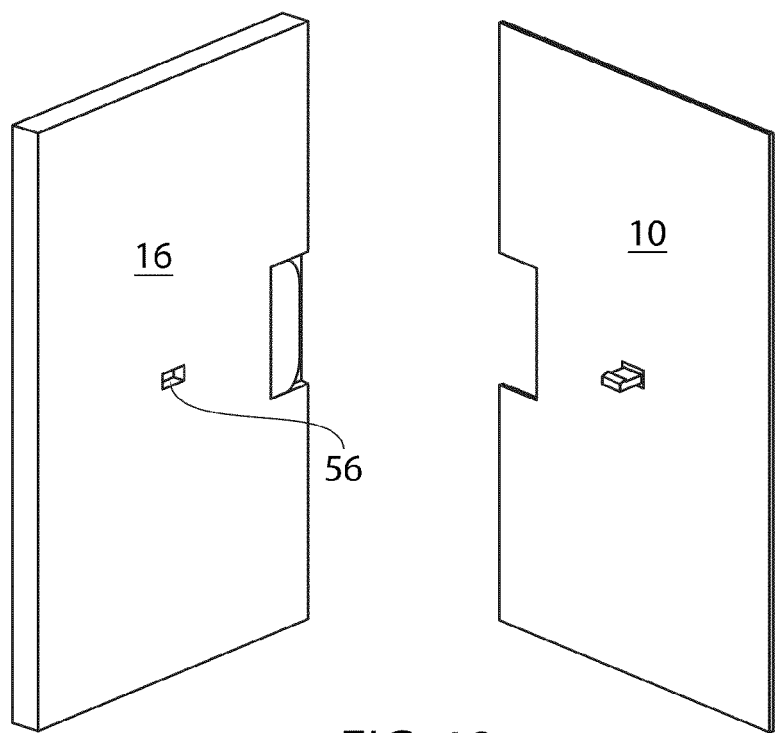

A further embodiment of a securing system for maintaining the panel in place against the door is a push/push system. Push/push systems are used in other aircraft systems in order to maintain items in place, such as drawers and cabinets. In the push/push embodiment, the user can simply press on the external surface of the panel in order to cause it to latch in place against the door. As shown in FIGS. 12 and 13, when a user presses on the panel against the door, one or more push/push latches 56 located on an external portion of the front 46 of the door springs in or out and secures the panel in place against the door or releases the panel from the door. When the panel is to removed for replacement, the user presses the panel back in, and the push/push latch 56 releases the panel from its secured position. For safety purposes, it is possible to add an additional securing mechanism to prevent the panel from being released from the door upon an accidental press of the panel. Additionally or alternatively, the push/push latch can be designed to require a large amount of force.

A further embodiment of a securing system for maintaining the panel in place against the door is an adhesive system. The adhesive may be a wallpaper-type adhesive that is simply applied to or provided on a panel so that it can be secured to an existing door or surface. Other adhesive systems may include a peel-and stick feature on the back of the panel. For example, the panel may be provided with a gummy backing that is covered by a thin film. The thin film may be removed and the panel can be secured to the desired door or surface. It is possible to also provide the door or surface with the thin slight edge discussed above to make placement of the panel more precise.

A further embodiment includes a static cling panel. The panel may be formed of a thin piece of static-adhering material that does not use any adhesive. Static holds the panel or decal firmly in place. The static cling material used to form the panel may be vinyl, gel, PVC, foam or any other appropriate static cling material. In this embodiment, the panel is not a rigid structure, but is a static-cling film that can be applied, removed, and re-applied to varying surfaces.

Figure 14:
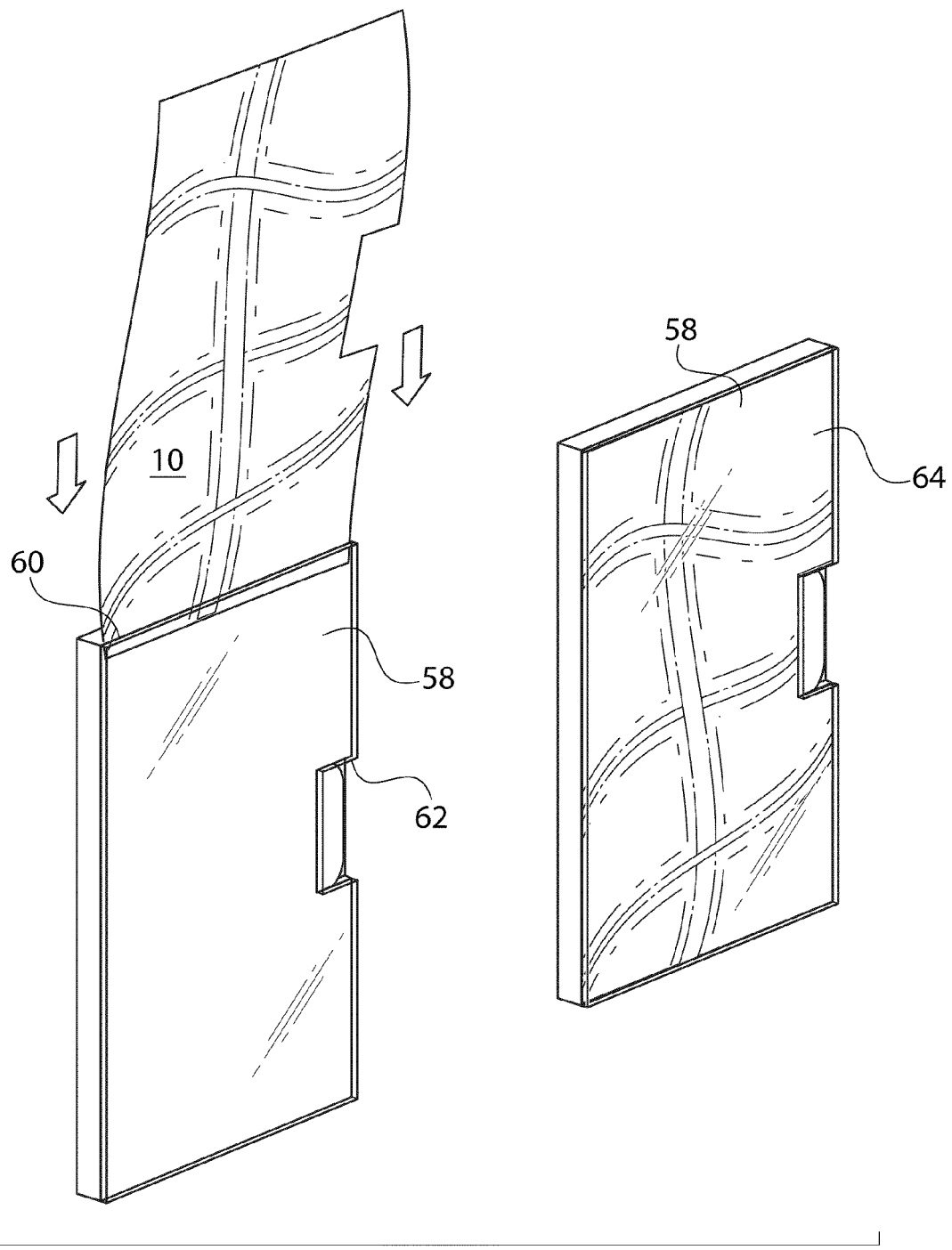
FIG. 14 shows a sleeve embodiment for securing a panel to a receiving surface.

A further panel securing embodiment shown in FIG. 14 includes a sleeve insert 58 on the front of the door or surface to be resurfaced. This embodiment can be useful in retrofitting a current door or surface, in addition to being used with a new surface with a sleeve already attached thereto or formed therewith. In a specific embodiment, the door or surface is provided with a sleeve 58, and in an even more particular embodiment, the sleeve is a clear sleeve and/or a Plexiglas sleeve. The sleeve is secured to the door so that an opening 60 at the top of the sleeve allows a user to insert a panel or other substrate 10 with a visually appealing graphic or other design with an aesthetic quality into the sleeve. For example, the substrate may have any of the above-described qualities, such as a design to create a billboard effect or a single colored substrate, a patterned substrate or a substrate with any other pleasing feature. The substrate may be a panel, a pre-printed paper, a cloth-like material, or any other appropriate substrate that can be inserted into the sleeve.

The sleeve should be open at the top, as well as along any portion of the sleeve that surrounds handle 62 or any other portion of the door so that when the user slides the substrate into the sleeve, it can slide all the way down to and rest completely against the bottom of the sleeve. Instead, the sleeve may be open along one of the sides 64 for inserting the substrate into a side portion. An alternate to the sleeve embodiment is to provide one of the above-described panels (that fit into a channel) as a sleeve, so that the panel itself may allow various substrates to be inserted and removed.

Figure 15:
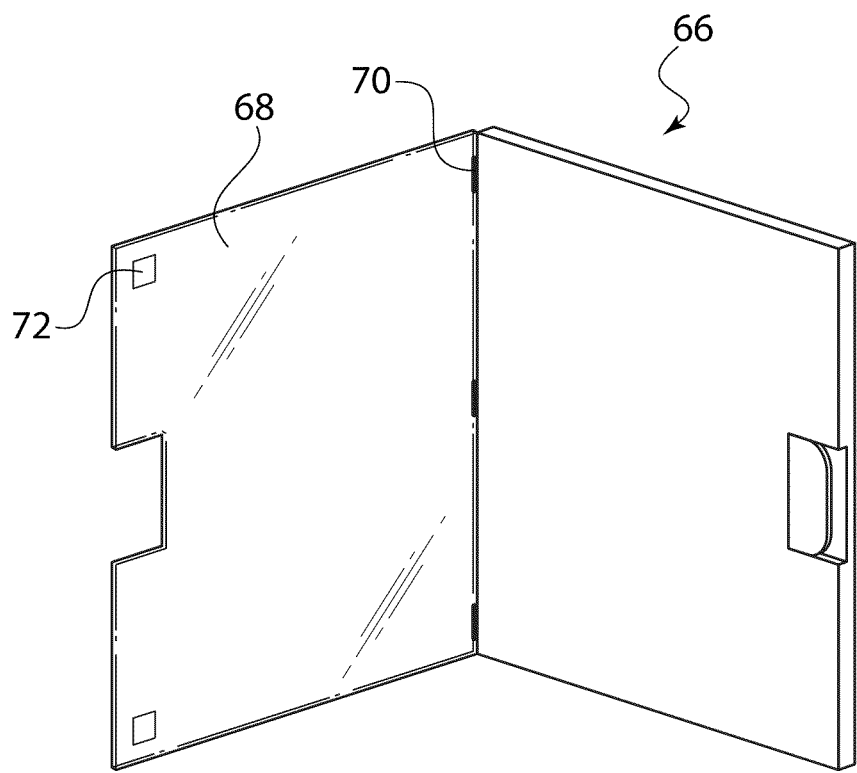
FIG. 15 shows a hinged frame embodiment for securing a panel to a receiving surface.

A further securing system for a removable panel comprises a frame system 66. An example of this embodiment is shown in FIG. 15. The frame system 66 may be a hinged frame 68, such that a hinged portion is secured to the door and can swing open or out for insertion of a substrate having an aesthetic quality. The hinged frame portion may be secured to the door at one side via one or more hinges 70. It may have its opposite side secured to the door or other surface via a snap, a magnet, a detent, a push/push system, or any other appropriate securing system 72.

Figure 16:
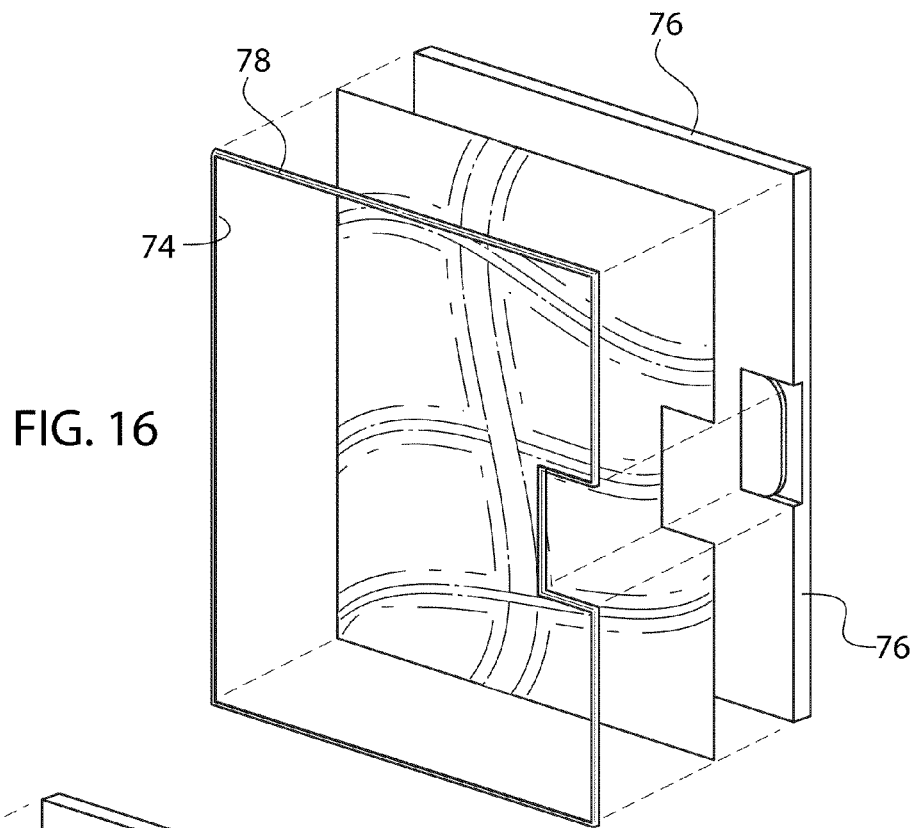
FIG. 16 shows a removable frame embodiment for securing a panel to a receiving surface.

Another frame embodiment provides a removable frame 74 that can be snap-fit around a door edge. An example of this embodiment is shown in FIG. 16. For example, the frame may be a generally rectangular-shaped material (or a shape corresponding to the receiving surface) that is designed to fit around the edges of the door or receiving surface. A substrate having an aesthetic quality may be placed against the door and the removable frame can be snap-fit around the door to secure the substrate in place. In a specific embodiment, the frame has edge portions 78 that can snap-fit around the door edges. In another embodiment, the frame has one or more protrusions along the back of the frame (e.g., along the edges) that fit into one or more corresponding indentations in the door. In a further embodiment, the frame is magnetic and is designed to magnetically secure to the door.

Figure 17:
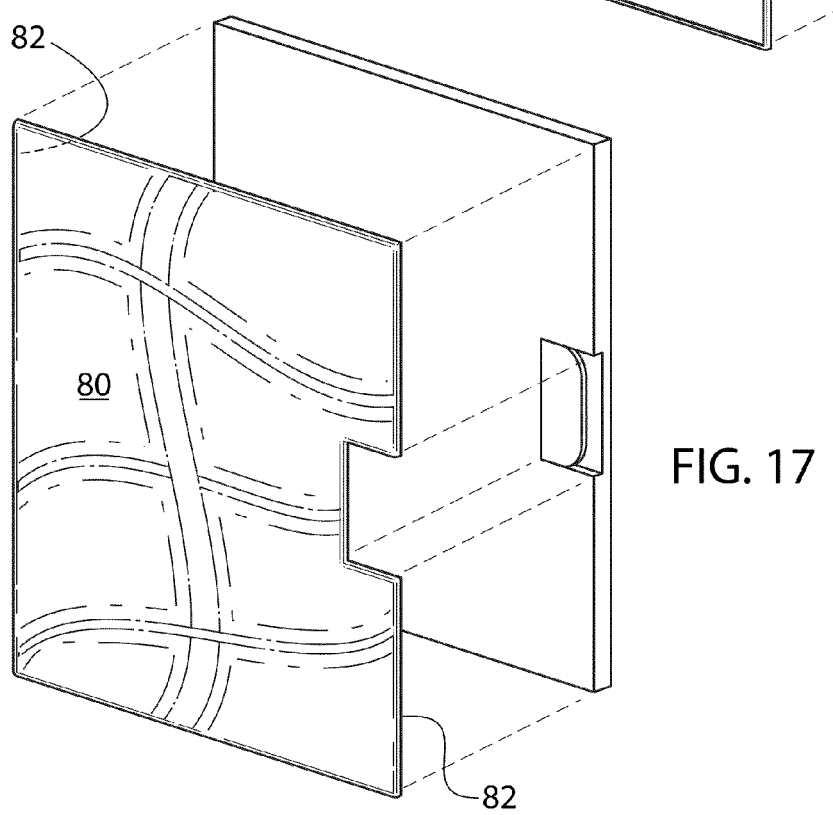
FIG. 17 shows a removable panel embodiment for securing a panel to a receiving surface.

An even further securing system for a removable panel comprises a panel 80 having snap edges 82 that can secure directly to a door or other surface. An example of this embodiment is shown in FIG. 17. For example, the edges of the panel may be curved edges that are designed and shaped to fit around door edges and secure the panel in place. The curves may be radiused so that they can expand slightly in order to go around a door edge and then snap into place. The snap panels may also be secured via other methods in order to confirm a strong attachment, such as via magnetic portions, an adhesive portion, or any other appropriate securing feature.

Another feature provided is the ability to obtain a single certification for the panel inserts, such that once certified by the FAA, the panel inserts can be removed and replaced without additional re-certification for each part. In one proposed approach, the panel inserts are designated as trim to the component to which they are intended to be releaseably secured. The process includes certifying and qualifying a first a panel insert having one color or design, but then allowing that panel insert to be interchangeable with any number of second panel inserts from the family 12 without a new certification process. Thus, after an airline installs qualified and certified unit, component or piece of equipment, it is free to replace the panel inserts with any other panel insert in the family (e.g., a billboard panel 13 or a single panel 14 or any other option) having a different color or design without having to create a new unit part number and subsequently re-qualify or certify the unit, component or piece of equipment.

In short, this option allows the fit, form, and function of the panel inserts to be pre-qualified with the FAA for the entire family of interchangeable panel inserts, without obtaining new parts numbers for each panel. Additionally, qualified and certified equipment may be shipped with a panel insert (showing a different design or color than the panel insert that went through the original certification) without having to obtain new part numbers. Materials, colors, dimensions, construction parameters, and any other parameter that must be qualified of certified for safety and other FAA reasons will all be certified initially and then panel inserts from the family will be easily replaceable without further regulatory efforts.

Changes and modifications, additions and deletions may be made to the structures and methods recited above and shown in the drawings without departing from the scope or spirit of the invention and the following claims.

What is claimed is:

1. A panel insert system comprising: an aircraft galley component door, the aircraft galley component door comprising: a receiving surface and a raised edge bordering the receiving surface, and a plurality of panel inserts, each of the panel inserts displaying a portion of a visual scene, each of the panel inserts configured to be removeably secured to the receiving surface the aircraft galley component door such that a single panel insert is removeably secured to the aircraft galley component door via a plurality of discrete magnets or magnetically responsive surfaces, each of panel inserts having a thickness rendering the panel insert generally flush with the raised edge of the receiving surface when secured, wherein the portions of a visual scene of each of the plurality of panel inserts collectively form a visual effect across a plurality of aircraft galley components.

2. The panel insert system of claim 1, wherein each panel insert comprises a series of discrete magnets or magnetically responsive surfaces positioned on the panel insert, and wherein the receiving surface comprises a series of corresponding discrete magnets or magnetically responsive surfaces positioned on the receiving surface, wherein in use, the panel insert abuts the raised edge of the receiving surface and cooperates with the receiving surface via cooperation between the series of discrete magnets and the series of corresponding discrete magnetically responsive surfaces to provide a releasable and interchangeable securing system for securing the panel insert to the receiving surface on-board the aircraft.

3. The panel insert system of claim 1, wherein the raised edge of the receiving surface comprises a continuous straight raised edge.

4. A method for re-surfacing an aircraft component, comprising:
   (a) identifying an aircraft galley component door to be re-surfaced, the door comprising a receiving surface and a raised edge along at least one edge of the receiving surface;
   (b) selecting from a plurality of panel inserts, a single panel insert to use to re-surface to aircraft galley component door, each panel insert comprising a plurality of discrete magnets or magnetically responsive surfaces positioned thereon; wherein each of the plurality of panel inserts displaying a portion of a visual scene; wherein the receiving surface of the aircraft galley component door comprises a plurality of discrete corresponding magnets or magnetically responsive surfaces;
   (c) installing the selected panel insert on the aircraft receiving surface by allowing the plurality of magnets or the magnetically responsive surfaces of the panel insert to contact the corresponding magnets or the magnetically responsive surfaces of the receiving surface such that the single selected panel insert is removeably secured to a single aircraft galley component door, wherein when installed, the selected panel insert is generally flush with the raised edge of the receiving surface; wherein the portions of a visual scene of each of the plurality of panel inserts collectively form a visual effect across a plurality of aircraft galley components.

5. The method of claim 4, wherein each panel insert in the plurality of panel inserts or the receiving surface comprises a locator pin and wherein the other of the panel insert or the receiving surface comprises a corresponding protrusion.

6. The method of claim 4, wherein the edge of the receiving surface assists with positioning the panel insert and with preventing sliding of the panel insert in order to help stabilize and secure the panel insert in place.

7. The method of claim 4, wherein each panel insert in the plurality of panel inserts has an aesthetic quality and the aesthetic quality comprises one or more of a visual indicia, imprinted graphics, promotional indicia, decorative items, artwork, pattern, picture, text, printing, logo, photo, symbol, or design.

8. The method of claim 4, wherein each panel insert in the plurality of panel inserts has a graphic image different from other panel inserts in the plurality of panel inserts, and a visual effect of the different graphic images from more than one panel insert secured to more than one aircraft component comprises a billboard effect across multiple discrete components.

9. The method of claim 4, wherein each panel insert in the plurality of panel inserts has an aesthetic quality and the aesthetic quality comprises a stainless steel finish, a glossy or matte color finish, a fabric-type material, a wood-like or wood finish, laminate, vinyl, real or faux leather, metal, ceramic, plastic, glass, bendable glass, mirror-type or reflective finish, whiteboard material, hologram, lenticular image, or chalkboard finish.

10. The method of claim 4, wherein the receiving surface comprises a storage cabinet door, a lavatory door, an overhead compartment door, a galley cart/trolley, a food service cart, a coat closet door, a cockpit door, a divider panel, a tray table, a seat back, or an exit row panel.

11. The method of claim 4, wherein the plurality of panel inserts comprises a first family that has a first aesthetic quality and a second family of multiple panel inserts interchangeable with the first family, the second family of multiple panel inserts comprising a second aesthetic quality.

12. The method of claim 4, wherein raised edge comprises a straight raised edge that is provided around the entirety of the receiving surface, and wherein the selected panel insert is positioned within confines of the straight raised edge.

13. The method of claim 4, wherein the plurality of panel inserts are designed for interchangeability with other panel inserts, such that the aircraft component may be re-surfaced with any panel insert from the plurality of panel inserts.

14. The method of claim 4, wherein the raised edge of the receiving surface comprises a continuous straight raised edge.

* * * * *